United States Patent
Maheshwari

(10) Patent No.: US 9,465,576 B1
(45) Date of Patent: Oct. 11, 2016

(54) FIRST-IN-FIRST-OUT (FIFO) MEMORY DEVICES AND METHODS HAVING MULTIPLE QUEUING

(75) Inventor: Dinesh Maheshwari, Fremont, CA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 590 days.

(21) Appl. No.: 12/900,283

(22) Filed: Oct. 7, 2010

Related U.S. Application Data

(60) Provisional application No. 61/249,577, filed on Oct. 7, 2009.

(51) Int. Cl.
*G06F 5/06* (2006.01)
*G06F 3/06* (2006.01)

(52) U.S. Cl.
CPC ............. *G06F 5/065* (2013.01); *G06F 3/0613* (2013.01)

(58) Field of Classification Search
CPC ............. G06F 12/0246; G06F 3/0608; G06F 11/1048; G06F 2212/7208; G06F 3/061; G06F 3/0613; G06F 11/1004; G06F 13/385; G06F 15/16; G06F 2205/066; G06F 2206/1012; G06F 3/0658; G06F 3/0665; G06F 5/065
USPC ....... 711/101, 131, 144, 149, 151, 154, 156; 710/52, 57; 365/189.05, 189.07, 365/230.08; 370/394, 412
See application file for complete search history.

(56) References Cited

U.S. PATENT DOCUMENTS

| | | | |
|---|---|---|---|
| 5,519,701 A | 5/1996 | Colmant et al. | |
| 5,901,291 A | 5/1999 | Feeney et al. | |
| 6,292,491 B1 | 9/2001 | Sharper | |
| 6,430,156 B1 | 8/2002 | Park et al. | |
| 6,526,495 B1 * | 2/2003 | Sevalia et al. | 711/173 |
| 6,538,467 B2 | 3/2003 | Bentz | |
| 6,564,309 B1 * | 5/2003 | Fuin | 711/168 |
| 6,684,317 B2 * | 1/2004 | Wang et al. | 711/218 |
| 6,892,199 B2 | 5/2005 | Hong et al. | |
| 6,907,479 B2 * | 6/2005 | Karnstedt et al. | 710/52 |
| 7,120,075 B1 * | 10/2006 | Gibson et al. | 365/189.02 |
| 7,257,687 B2 * | 8/2007 | Au et al. | 711/156 |
| 7,668,187 B2 * | 2/2010 | Shaikli | 370/412 |
| 8,559,439 B1 * | 10/2013 | Dongare et al. | 370/394 |
| 8,571,048 B2 * | 10/2013 | Curcio et al. | 370/412 |
| 2009/0086748 A1 | 4/2009 | Wang et al. | |

OTHER PUBLICATIONS

"Interfacing the IDT 3.3V Multi-Queue FIFO to a Virtex-II FPGA",http://www.xilinx.com/support/documentation/application_notes/xapp629.pdf.

"Maximum I/O Flexibility for RTL-like Performance", http://www.tensilica.com/products/xtensa-customizable/xtensa-lx2/i-o-bandwidth.htm.

Mondrian Nüssle, Benjamin Geib, Holger Fröning, Ulrich Bröning, "An FPGA-based custom high performance interconnection network"; http://ra.ziti.uni-heidelberg.de/pages/publications/papers/2009/7.pdf.

* cited by examiner

*Primary Examiner* — Zhou Li

(57) ABSTRACT

A first-in-first-out (FIFO) memory device may include a plurality of memory locations configurable into M input queues comprising sequences of input data values and N output queues for storing sequences of output data values, wherein N is not equal to M.

22 Claims, 9 Drawing Sheets

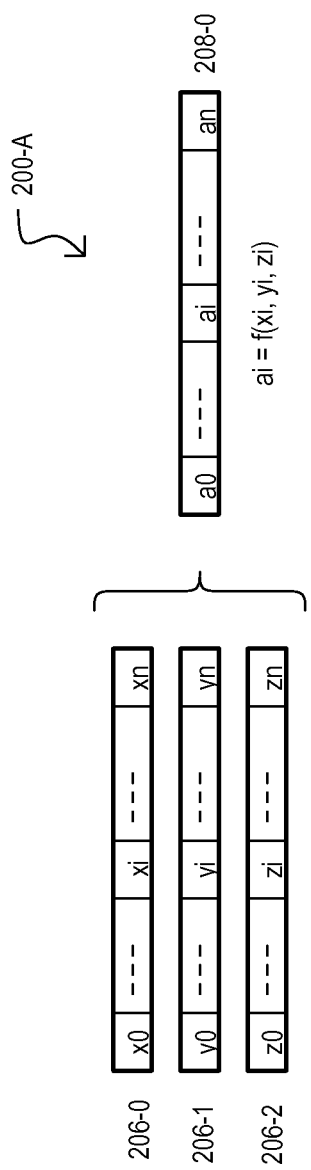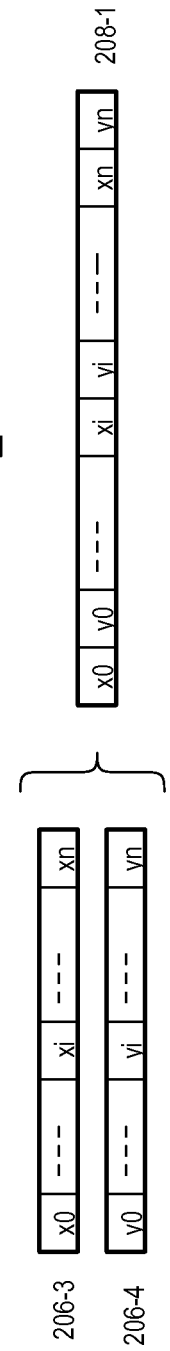
FIG. 2A
FIG. 2B

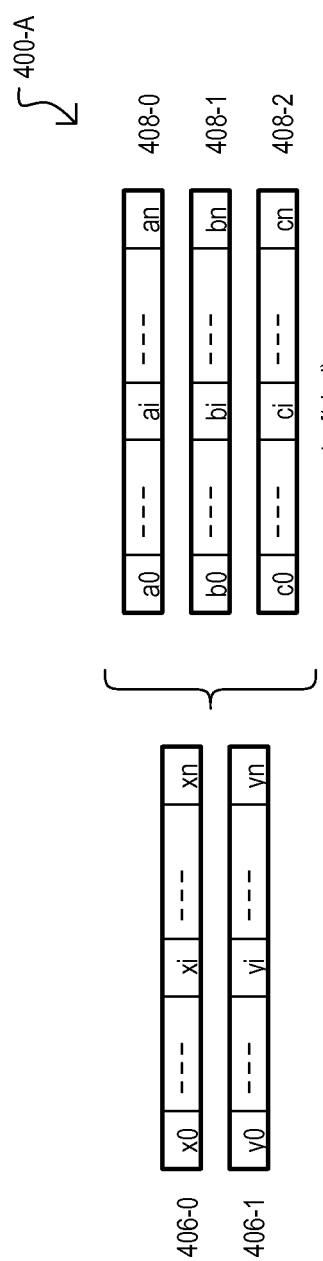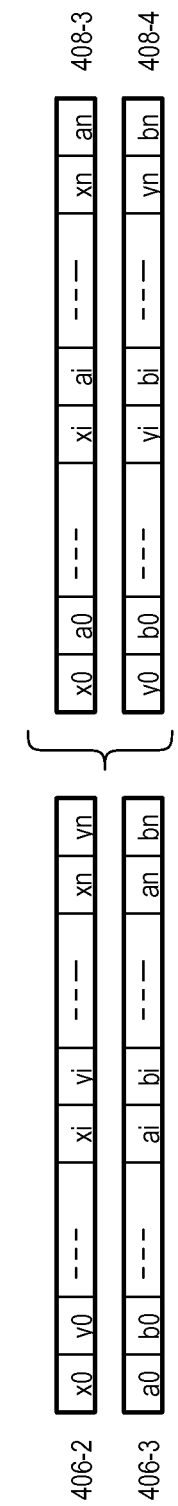
FIG. 4A
FIG. 4B

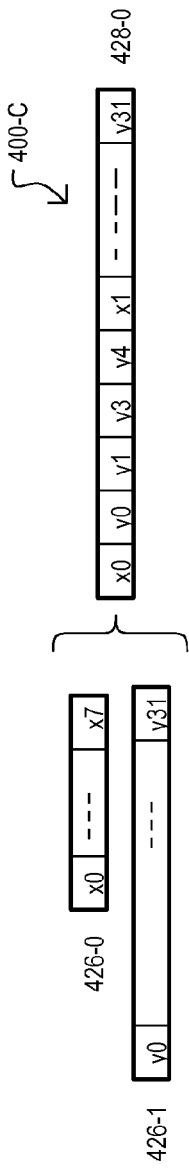
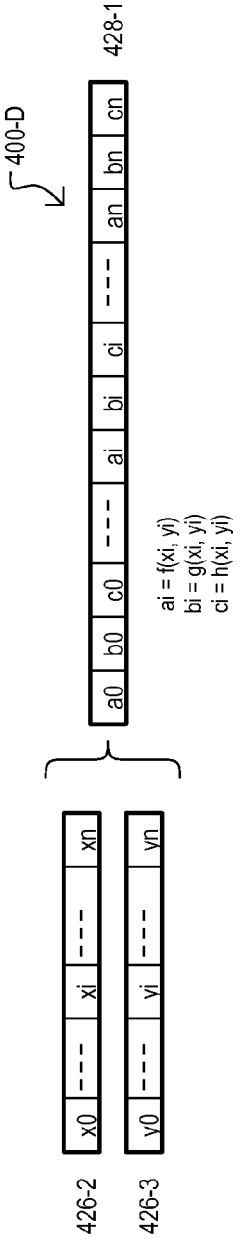
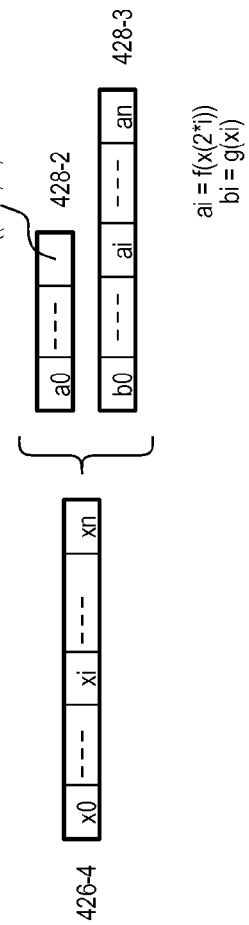
FIG. 4C
FIG. 4D
FIG. 4E

| QUEUE ID (hex) | TYPE (Input or Output) | VALID (0=Invalid) (1=Valid) | Word SIZE | Depth | SOURCE QUEUEs (for Output Queue only) | FUNCTION (for Output Queue only) |
|---|---|---|---|---|---|---|
| 00 | | | | | | |
| 01 | | | | | | |
| 02 | | | | | | |
| ⋮ | | | | | | |
| FF | | | | | | |

FIRST-IN-FIRST-OUT (FIFO) MEMORY DEVICES AND METHODS HAVING MULTIPLE QUEUING

This application claims the benefit of U.S. Provisional Patent Application Ser. No. 61/249,577, filed on Oct. 7, 2009, the contents of all of which are incorporated by reference herein.

TECHNICAL FIELD

The present disclosure relates generally to memory devices, and more particularly to memory devices that receive and/or output data in queues, and related methods of operation.

BACKGROUND

FIG. 7 shows a conventional first-in-first-out memory device (hereinafter a FIFO) 700 in a block diagram. A conventional FIFO 700 may be organized into M queues 702-1 to -M. Data may propagate through such queues in a first-in-first-out fashion. For example, as shown in FIG. 7, data values may be written into queue 702-1 in the order w0, w1, w2, and then subsequently read out in the same order w0, w1, w2.

The number of queues (702-1 to -M) in conventional FIFO 700 may be a relatively small fixed value, in the range of four to eight. The number of queues may be configurable operations machine, however once the FIFO has been configured, each queue has the same depth (i.e., number of storage locations). Each queue (702-1 to -M) may be conceptualized as a FIFO of its own, receiving and outputting data values independently of the other queues.

BRIEF DESCRIPTION OF THE DRAWINGS

FIGS. 2A and 2B are block diagrams showing FIFO configurations according to embodiments.

FIGS. 4A and 4B are block diagrams showing FIFO configurations according to further embodiments.

FIGS. 4C to 4E are block diagrams showing FIFO configurations according to further embodiments.

DETAILED DESCRIPTION

Figure 1A:
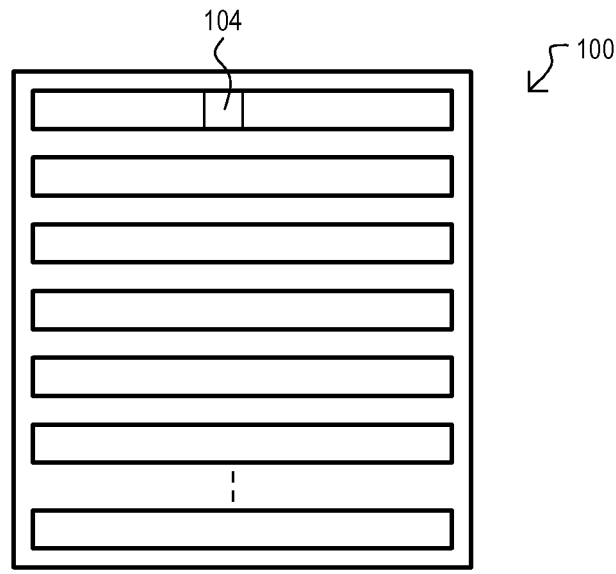
FIGS. 1A and 1B are diagrams showing a memory device according to an embodiment.

Various embodiments will now be described that show memory devices and methods for a flexible queue out memory device, in which queue data flows may be interrelated, including having programmable configurations. In the following description, like sections are referred to by the same reference character but with the first digit(s) corresponding to the figure number.

Figure 1B:
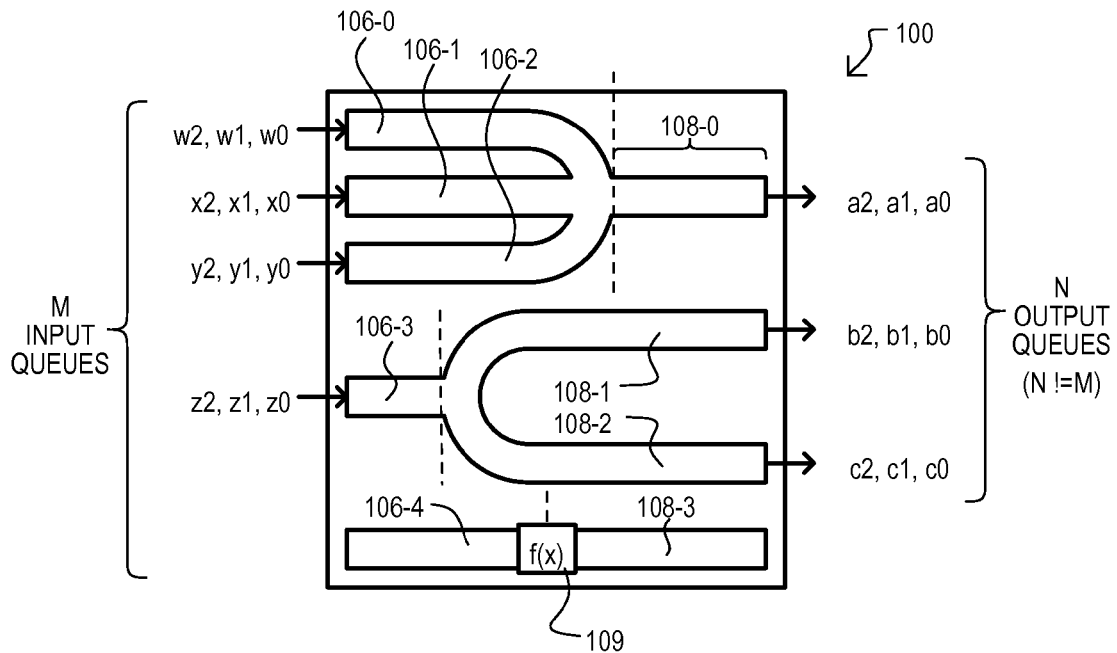

Referring to FIGS. 1A and 1B, a memory device according to one embodiment is shown in a sequence of block diagrams, designated by the general reference character 100. The memory device will be referred to as a FIFO, but as will be noted below, alternate embodiments may include memory devices that process queues of data, but not necessarily in a FIFO order.

FIG. 1A shows FIFO 100 before being programmed. FIG. 1B shows FIFO 100 after being programmed into one very particular configuration.

Referring to FIG. 1A, a FIFO 100 may include a plurality of storage locations (one shown as 104) into which data values may be written and read in a first-in-first-out fashion. Storage locations (e.g., 104) may be organized into multiple queues. However, unlike a conventional FIFO, like that of FIG. 7, queues may be related to one another, rather than operate independently of one another. As will be described in more detail below, in some embodiments the contents of one queue may be derived from the contents of one or more other queues.

Figure 7:
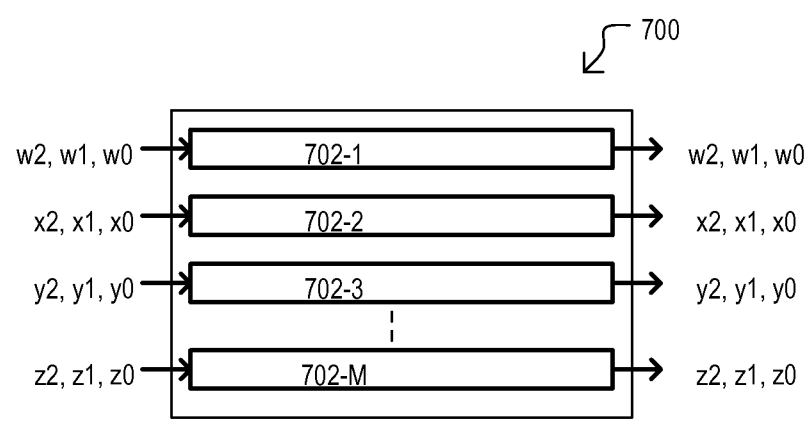
FIG. 7 is a block diagram of a conventional FIFO memory device.

Referring still to FIG. 1A, a FIFO 100 may be programmable into various configurations that provide functions well beyond a conventional FIFO, like that shown in FIG. 7. In very particular embodiments, queues may include input queues for storing input data values written into the FIFO 100, and output queues that store output data values to be read out form the FIFO 100.

A functional relationship between input and output queues may be programmable. For example, data values of more than one input queue may be used to form data values for one output queue and vice versa. Multiple input queues may be merged into a smaller number of output queues, or one or more input queues may be split into a larger number of output queues. Such programmability may enable FIFO configurations having a different number of input queues than output queues. Still further, in some embodiments, an output queue may be configured to be a function (e.g., arithmetic/logic operation) of one or more input queues.

In a very a particular embodiment, a FIFO 100 may be programmable into substantially more queues than a typical conventional FIFO, including greater than 128 queues. Further, unlike a conventional FIFO (e.g., FIG. 7), queue depths (i.e., the number of storage locations in a queue) may be programmable, allowing queues of different sizes to be operating in the same FIFO 100.

Referring now to FIG. 1B, a FIFO 100 having one particular configuration is shown in a block diagram. It is understood that FIG. 1B is but one configuration of numerous possible configurations. In the configuration of FIG. 1B, FIFO 100 has been programmed into a configuration that includes input queues 106-0 to -4 and output queues 108-0 to -3. Further, as configured, a total number of input queues may be a value M, while a total number of output queues may be N, where M≠N.

Referring still to FIG. 1B, in the configuration shown, output queue 108-0 may correspond to input queues 106-0, -1, and -2. That is, input data values from input queues 106-0, -1, -2 may be utilized to form output data values for output queue 108-0. Such a relationship may be conceptualized as a number of input queues (3 in this example) "merging" into a smaller number of output queues (1 in this example).

FIG. 1B also shows the opposite case. Output queues 108-1 and -2 may correspond to input queue 106-3. That is, input data values from input queue 106-3 may be utilized to form output data values for both of output queues 108-1 and -2. Such a relationship may be conceptualized a "splitting" a number of input queues (1 in this example) into a larger number of output queues (2 in this example).

FIG. 1B shows yet another type of relationship between input and output queues. Output queue 108-3 may correspond to input queue 106-4, and thus may initially appear to operate like a conventional queue. However, values in output queue 108-3 may be some function of input values within input queue 106-4. Such a relationship is represented in FIG. 1B by function operation 109.

It is understood that FIG. 1B represents a logical grouping of storage locations within a FIFO 100, and not necessarily a physical relationship between circuit elements. For example, in one very particular embodiment, queues may be formed by pointers to physical address locations to storage locations within one or more memory arrays. As will be described below, in some embodiments a memory device may only physically include input queue storage locations, generating output queue values by reading from (and optionally operating on) input queue data values. In other embodiments, the reverse may be true. A memory device may only physically include output queue storage locations, generating output queue values by operating on input queue data values as they are read into the FIFO. Finally, still other embodiments may dedicate storage to both input and output queues.

In this way, a FIFO may be configurable to provide input queues and output queues having relationships between one another.

It is also noted that FIG. 1B may represent a non-programmable embodiment separate from that of FIG. 1A. That is, a FIFO 100 may be "hard-wired" to provide the illustrated functionality.

As noted above, a FIFO according to one embodiment may be configured to include an output queue corresponding to multiple input queues. That is, an output queue may be synthesized from two or more input queues. Two particular configurations of such an arrangement are shown in FIGS. 2A and 2B.

Referring to FIG. 2A, a FIFO configuration is shown in a block diagram and designated by the general reference character 200-A. A FIFO configuration 200-A may include input queues 206-0, -1, -2 and a corresponding output queue 208-0. Input queues (206-0, -1, -2) may have equal depths, each having n+1 storage locations.

Output queue 208-0 may be an arithmetic/logic function of input queues (206-0,-1,-2). In the embodiment shown, the relationship is given as:

$$a_i = f(x_i, y_i, z_i)$$

where "ai" is an output data value stored in position "i" of output queue 208-0, "xi" is an input data value stored in position "i" of input queue 206-0, "yi" is an input data value stored in position "i" of input queue 206-1, "zi" is an input data value stored in position "i" of input queue 206-2, and f( ) is an arithmetic logic function.

In this way, an output queue may be an arithmetic/logic function of one or more input queues.

Referring to FIG. 2B, another FIFO configuration is shown in a block diagram and designated by the general reference character 200-B. A FIFO configuration 200-B may include input queues 206-3,-4 and a corresponding output queue 208-1. Input queues (206-0,-1,-2) may have equal depths, each having n+1 storage locations.

Output queue 208-0 may be obtained by interleaving input data values from the corresponding input queues (206-3,-4). In the particular embodiment shown, input data values from different input queues are alternated with one another. However, alternate embodiments may include different types of interleaving (e.g., alternating sequences larger than one data value, different size sequences according to input queue. etc.).

In this way, an output queue may include interleaved data values from two or more input queues.

As also noted above, a FIFO according some embodiments may be configured to include multiple output queues corresponding to a smaller number of input queues. That is, multiple output queues may be synthesized from a smaller number of input queues. Two particular configurations of such an arrangement are shown in FIGS. 3A and 3B.

Figure 3A:
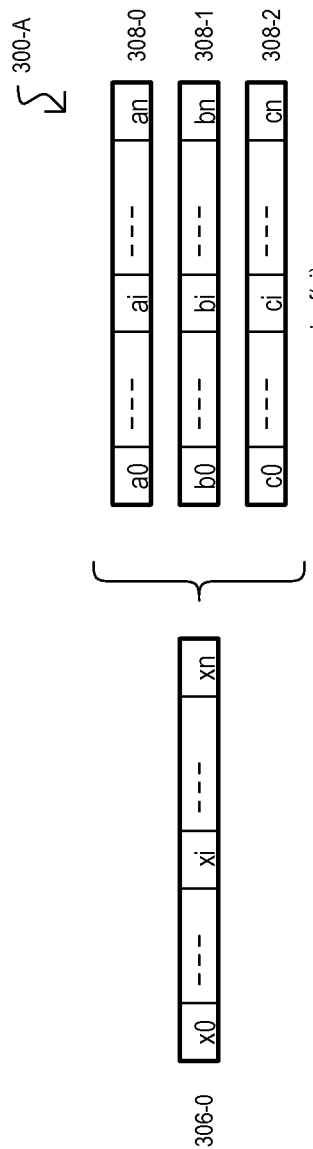
FIGS. 3A and 3B are block diagrams showing FIFO configurations according to other embodiments.
Figure 3B:
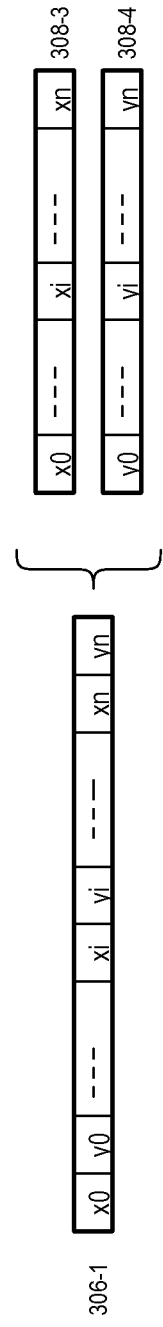

Referring to FIG. 3A, a FIFO configuration is shown in a block diagram and designated by the general reference character 300-A. A FIFO configuration 300-A may include an input queue 306-0 and corresponding output queues 308-0, -1, -2. Input queue 306-0 may have n+1 storage locations.

Output queues 308-0, -1, -2 may each be different arithmetic/logic functions of input queue 306-0. In particular, in the embodiment shown, output queue 308-0 may be described as $a_i = f(x_i)$, output queue 308-1 may be described as $b_i = g(x_i)$, output queue 308-2 may be described as $c_i = h(x_i)$. A value "ai" is an output data value stored in position "i" of output queue 308-0, "bi" is an output data value stored in position "i" of output queue 308-1, "ci" is an output data value stored in position "i" of output queue 308-1, and "xi" is an input data value stored in position "i" of input queue 306-0. Functions f( ), g( ) and h( ) may each be different arithmetic logic functions.

In this way, multiple output queues may be an arithmetic/logic function of a fewer number of input queues.

Referring to FIG. 3B, another FIFO configuration is shown in a block diagram and designated by the general reference character 300-B. A FIFO configuration 300-B may include input queue 306-1 and a corresponding output queues 308-3 and -4.

Output queues (308-3, -4) may be obtained by "de-interleaving" input data values from the corresponding input queue 306-1. De-interleaving may include sending some input data values of a received sequence to one output queue, while sending other input data values of the sequence to one or more other output queues. In the particular embodiment shown, input data values may be sent to the two different output queues (308-3, -4) in an alternating fashion. However, just as interleaving operations may take various forms in the case of FIG. 2B, de-interleaving operations may also take various other forms.

In this way, output queues may include output data value sequences created by de-interleaving input data values from one or more input queues.

While the embodiments of FIGS. 2A to 3B have particularly shown one-to-many type relationships between input queues and output queues, embodiments may also include many-to-many type relationships between input and output queues. By way of illustration only, two such embodiments are shown in FIGS. 4A and 4B.

Referring to FIG. 4A, yet another FIFO configuration is shown in a block diagram and designated by the general reference character 400-A. A FIFO configuration 400-A may include an input queues 406-0, and -1 and a corresponding output queues 408-0, -1, -2. Input queues (406-0,-1) may each have n+1 storage locations.

Output queues 408-0, -1, -2 may each be different arithmetic/logic functions of both input queues 406-0, -1. In particular, in the embodiment shown, output queue 408-0 may be described as $a_i = f(x_i, y_i)$, output queue 408-1 may be described as $b_i = g(x_i, y_i)$, output queue 408-2 may be described as ci=h(xi, yi). A value "ai" is an output data value stored in position "i" of output queue 408-0, "bi" is an output data value stored in position "i" of output queue 408-1, "ci" is an output data value stored in position "i" of output queue 408-2, "xi" is an input data value stored in position "i" of input queue 406-0, and "yi" is an input data value stored in position "i" of input queue 406-1. Functions f( ), g( ) and h( ) may each be different arithmetic logic functions.

In this way, multiple output queues may be an arithmetic/logic function of a multiple input queues.

Referring to FIG. 4B, a further FIFO configuration is shown in a block diagram and designated by the general reference character 400-B. A FIFO configuration 400-B may include input queues 406-2 and -3 and a corresponding output queues 408-3 and -4.

Output queues (408-3, -4) may be obtained by different de-interleaving operations on input queues 406-2,-3. As shown, input queue 406-0 may be de-interleaved, in an alternating fashion, into even locations of output queues 408-3, -4, while input queue 406-1 may be de-interleaved, in an alternating fashion, into odd locations of output queues 408-3, -4. As noted in other embodiments above, other de-interleaving variations are possible.

In this way, multiple output queues may include output data value sequences created by de-interleaving input data values from multiple input queues.

It is understood that while embodiments like that shown in FIGS. 2A and 2B show input queues having the same size, related input queues may have different sizes and rates to arrive at an output queue. One particular embodiment illustrating such an arrangement is shown in FIG. 4C.

Referring to FIG. 4C, an embodiment in which input queues may have different sizes is shown in a block diagram. In FIG. 4C, output queue 428-0 may be created by interleaving values from input queue 426-0 at a different rate than input queue 426-1. In particular, every fourth value may be derived from input queue 426-0, while the remaining values may be derived from larger input queue 426-1.

It is also noted that output queue sizes may differ from input queue values even in cases where interleaving does not take place. One such embodiment is shown in FIG. 4D.

Referring to FIG. 4D, input queues 426-2 and 426-3 may have a same size. However, output queue 428-1 may be three times the size, being generated by performing three different operations on each data value of the input queues 426-2, -3.

Just as FIG. 4C shows input queues having variable rates and sizes, output queues may operate in a similar fashion. An example of such an embodiment is shown in FIG. 4D.

Referring to FIG. 4D, an output queue 428-2 may be created by operating on every other value from input queue 426-4. In contrast, output queue 428-3 may be created by operating on every value from input queue 426-4. Consequently, output queue 428-2 may be smaller than output queue 428-3. It is understood that according to an embodiment, a single FIFO may be configured to include any or all of the configuration types shown above. In a very particular embodiment, such a single FIFO may be one integrated circuit device, having all circuits formed in a same integrated circuit package, or a same integrated circuit substrate.

Figures 5, 6A:
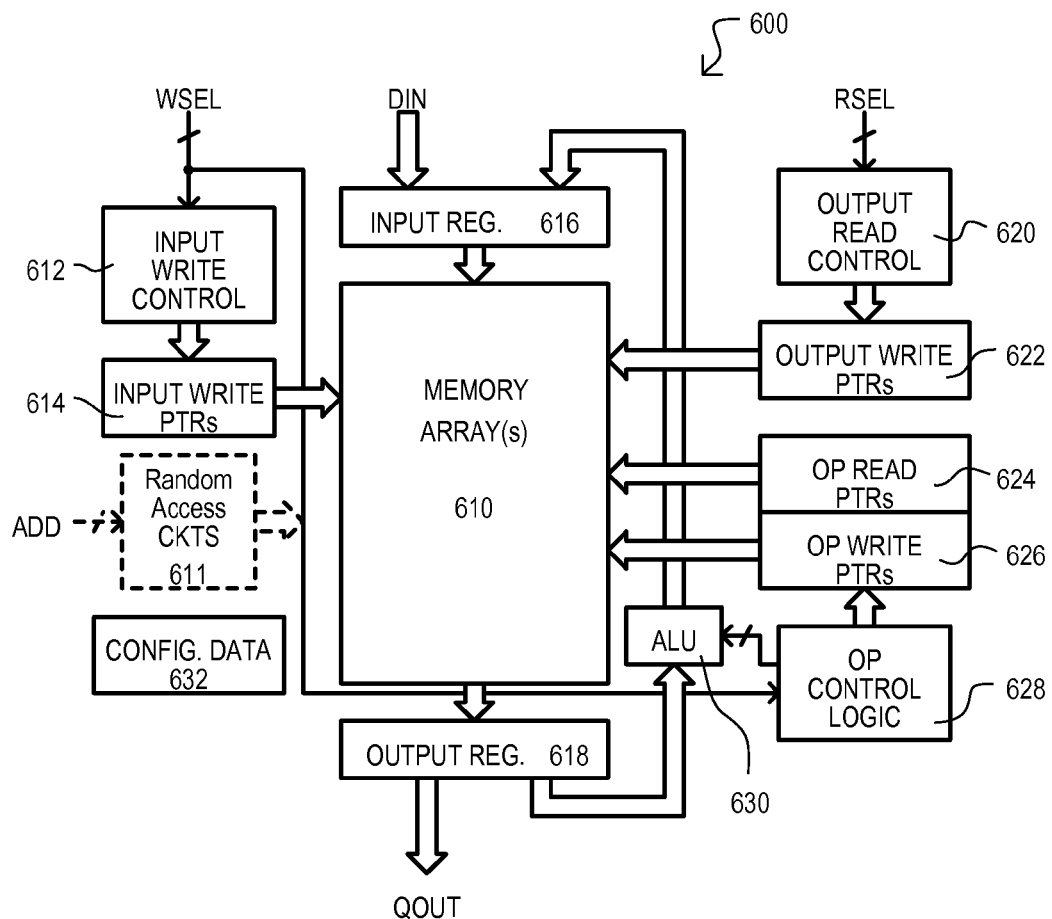
FIG. 5 is a table showing FIFO configuration values according to an embodiment.
FIGS. 6A to 6C are block schematic diagrams of memory devices according to various embodiments.

Referring now to FIG. 5, programming values for a FIFO, according to one very particular embodiment, are shown in a table. A QUEUE ID value may identify each possible queue of a FIFO. A TYPE value may define if the queue will function as an input queue or an output queue. A VALID value can indicate if the corresponding queue exists in the FIFO. A Word SIZE value may define how wide (e.g., in bits) a data word is for a queue. A Depth value may define how many storage locations are included within a queue. A SOURCE QUEUEs value may be appropriate only for output queues, and may identify those input queues used to synthesize the output queue. A FUNCTION value may also be appropriate for an output queue only, and may define what operations (if any) are performed on which source input queues to derive the output queue.

In this way, configuration values may be used to define any of multiple queues and queue relationships in a programmable FIFO.

Referring now to FIG. 6A, a memory device according to a very particular embodiment is shown in a block schematic diagram and designated by the general reference character 600. A memory device 600 may include one or more memory arrays 610, an input write control circuit 612, input write control pointers 614, an input register 616, an output register 618, output read control circuits 620, output write pointers 622, operation read pointers 624, operation write pointers 626, operation control logic 628, an arithmetic logic section 630, and a configuration data store 632.

Memory array(s) 610 may include memory cells addressable for read and write operations at physical addresses identified by the various pointers. Such physical addresses may correspond to particular queues as defined by configuration data 632. Memory array(s) 610 may have single port access or multi-port access.

Input write control circuits 612 may write data to a particular input queue based on write select values WSEL. It is understood that input read control circuits 612 may receive various other timing and control signals, as understood by those skilled in the art. Output read pointers 622 may indicate read locations for each output queue, as defined by configuration data 632, and may automatically increment and wrap around as data values are read into their corresponding queues.

An output register 618 may provide output data values read from output queues. However, in addition, output register 618 may also provide data values read from input queues in the process of generating output data values for related output queues.

Operation control logic 628 may control actions used to create output queue data. More particularly, in response to configuration data 632, operation control logic 628 may read input queue data values according to operation read pointers 624. Such data values may be read into arithmetic logic circuit 630. Based on configuration data, arithmetic logic circuits 630 may (or may not) execute predetermined operations on input data values to thereby generate output data values for corresponding output queues. Such output data values may then be written into appropriate output queue locations based on operation write pointers 626.

Referring still to FIG. 6A, in some embodiments, a memory device 600 may include random access circuits 611. Random access circuits 611 may enable data values to be read from or written to particular locations within memory array(s) 610. Accordingly, queue data physically stored within memory array(s) 610 may be accessed and/or operated on in a random access fashion.

FIG. 6A shows an arrangement in which a memory device 600 may have physical storage locations for both input queues and output queues. However, as noted above, other embodiments may not physical store input queue values or output queue values. Embodiments illustrating such approaches are shown in FIGS. 6B and 6C.

Figure 6B:
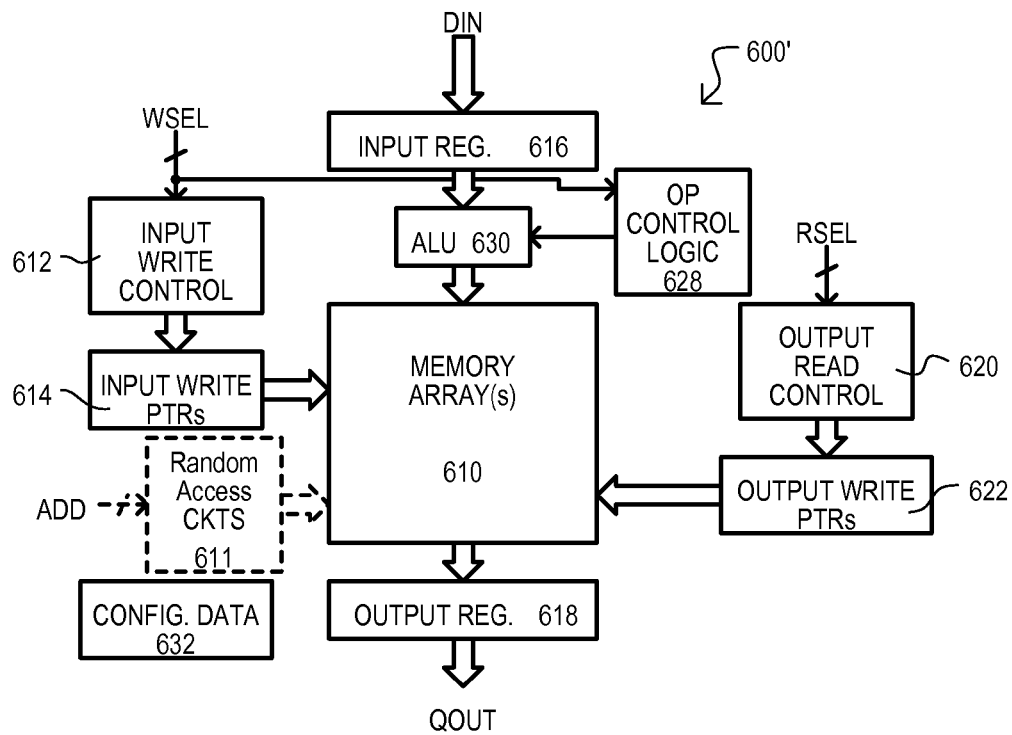

Referring now to FIG. 6B, a memory device according to another particular embodiment is shown in a block schematic diagram and designated by the general reference character 600'. A memory device 600' may include circuit sections like that of FIG. 6A.

However, unlike FIG. 6A, in the embodiment of FIG. 6B memory device 600' may only physically store output queue values. As input values are read into the FIFO, they may be operated on by arithmetic logic section 630 to generate output values which may then be physically stored to form output queues. In some embodiments, random access circuits 611 may be included to enable random access of output queue data values stored within memory array(s) 610.

Figure 6C:
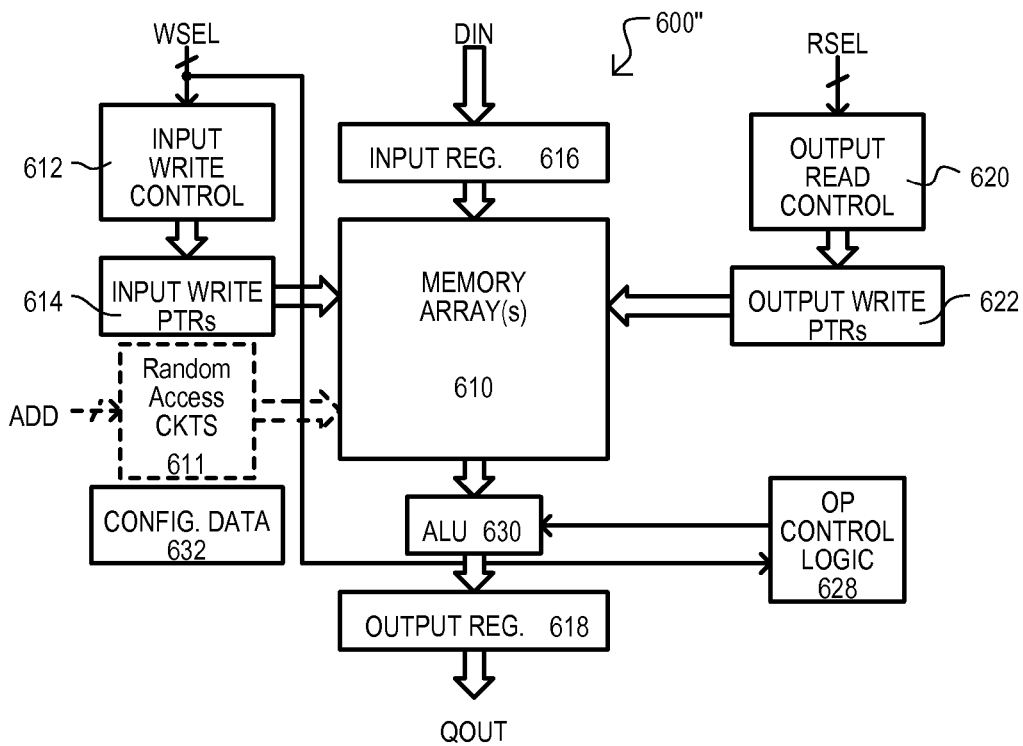

Referring now to FIG. 6C, a memory device according to another particular embodiment is shown in a block schematic diagram and designated by the general reference character 600". A memory device 600" may also include circuit sections like that of FIG. 6A.

However, unlike FIG. 6A, in the embodiment of FIG. 6C memory device 600" may only physically store input queue values. Input values are read into the FIFO and stored to form input queues. As input data values are read out of memory device 600" they may be operated on by arithmetic logic section 630 to generate output values which may represent output queue values. Like FIGS. 6A and 6B, in some embodiments, random access circuits 611 may be included to enable random access of input queue data values stored within memory array(s) 610.

It is understood that FIGS. 6A to 6C represent but a few of many possible embodiments, and one skilled in the art could arrive at various other circuits for implementing the memory device configurations shown above.

While embodiments may include memory devices, alternate embodiments may include data processing systems. Examples of system embodiments are shown in FIGS. 6D to 6F.

Figure 6D:
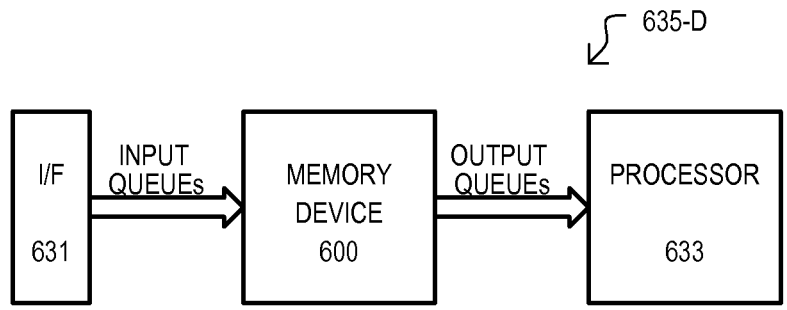
FIGS. 6D to 6F are block schematic diagrams of systems according to embodiments.

Referring to FIG. 6D, a system 635-D may include an interface 631, a memory device 600, and a processor 633. An interface may 631 may receive data values, for example, from a communication network, and provide input queues to memory device 600. Memory device 600 may be a memory device according to any of the embodiments shown above, or equivalents. A processor 633 may receive data on output queues from memory device 600.

Figure 6E:
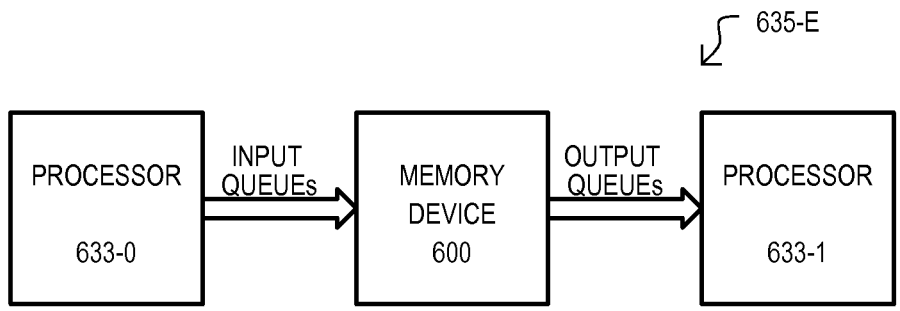

Referring to FIG. 6E, a system 635-E according to another embodiment may include a first processor 633-0 that may provide input queues to memory device 600. Memory device 600 may be a memory device according to any of the embodiments shown above, or equivalents. A processor 633 may receive data on output queues from memory device 600.

Figure 6F:
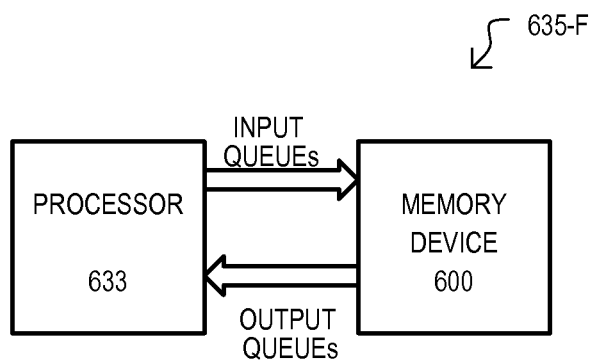

Referring to FIG. 6F, a system 635-F according to another embodiment may include a processor 633-0 that may provide input queues to memory device 600 and receive data on output queues from memory device 600. A memory device 600 may be a memory device according to embodiments shown above, or equivalents.

As noted previously, the various memory device configurations shown in the embodiments may not be programmable, but rather have input to output queue relationships determined by circuits with a set functionality.

Embodiments of the invention that provide for programmable queue depths may allow for optimal use of memory device density. This is in contrast to conventional approaches with fixed queue sizes that may unnecessarily include extra locations in a queue pipeline.

Embodiments of the invention that provide for interrelated queues may decrease bandwidth requirement and/or latency in a system. In particular, some applications may require switching between different queues, which may increase access times. A FIFO according to embodiments may present data from multiple queues at the same time, by interleaving and/or queue splitting as described above, and equivalents.

Embodiments of the invention may increase system bandwidth and computation resources over conventional approaches. Embodiments that perform arithmetic logic operations on input data streams to form output queues, may save computation resources of a processor in the system, effectively "pre-computing" results on entire data streams. Conventionally, a processor would have to execute a computation for each data value read from multiple FIFO queues.

Embodiments of the invention may increase flexibility in a system. In particular, a FIFO may be configured to generate multiple output queues from one input queue. Such an arrangement may allow access to such input data values in multiple ways before such values are overwritten with new input data. This is in contrast to a conventional approach in which multiple processes would have to arbitrate access to a same queue.

Embodiments of the invention may be included in numerous applications. As but a few examples, a FIFO according to embodiments may be included in data packet processing devices, such as base stations. Such processing devices may process packets differently according to some criteria, such as quality of service (QoS), as but one example. Packets arriving on one input queue may be sent to different output queues based on a QoS value of the packet. As but another example, in some video applications, a visible frame may present image data from two different sources (e.g., picture-in-picture) or area-of-interest (AOI). Video data on two different input queues may be merged into a single output queue.

Of course the above are but a few of many possible applications.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A memory device, comprising:
  a plurality of memory locations that form M input queues comprising sequences of input data values and N output queues that provide sequences of output data values, wherein N is not equal to M; and arithmetic logic circuits configured to perform arithmetic logic operations on data values of at least one input queue to form data values of at least one output queue;

wherein:

each output data value of an output queue is generated from at least one input data value of a corresponding input queue, and the output data values of each output queue have a same sequential order as the input data values of the corresponding input queue; and the memory device is programmable into a configuration that defines a number M of the input queues and a number N of the output queues, wherein the configuration includes a parameter which defines the arithmetic logic operations that are performed on the at least one output queue.

2. The memory device of claim 1, wherein:

the output queues are programmable to combine data values of multiple input queues into a smaller number of output queues.

3. The memory device of claim 2, wherein:

combining data values includes interleaving data values of multiple input queues into a smaller number of output queues.

4. The memory device of claim 2, wherein:

combining data values includes performing an arithmetic or logical operations on data values of multiple input queues to form at least one output queue.

5. The memory device of claim 1, wherein:

each of a plurality of output queues stores is formed by an arithmetic or logical operation on data values of a smaller number of input queues.

6. The memory device of claim 1, wherein:

each of a plurality of output queues is formed from a same input queue.

7. The memory device of claim 1, wherein:

the memory device is a first-in-first-out (FIFO) memory device and the sequences of output data values have a FIFO order corresponding to an order of data values of the input queues.

8. The memory device of claim 1, wherein:

the output data values of the at least one output queue are stored in the memory locations.

9. The memory device of claim 1, wherein:

the data values of the at least one input queue are stored in the memory locations.

10. A method, comprising:

receiving input data values as M input queues for a memory device;

providing output data values for read out from the memory device as N output queues, each output data value corresponding to at least one input data value, wherein the memory device is programmable into a configuration that defines a number M of the input queues and a number N of the output queues, and wherein the number M is not equal to the number N; and performing arithmetic logic operations on input data values of at least one input queue to generate output data values of at least one output queue;

wherein the configuration includes a parameter which defines the arithmetic logic operations that are performed on the at least one output queue;

wherein each output data value of an output queue is generated from at least one input data value of a corresponding input queue, and the output data values of each output queue have a same sequential order as the input data values of the corresponding input queue.

11. The method of claim 10, further including:

reading output data values from the output queues in a first-in-first-out order.

12. The method of claim 10, further including:

M is greater than N; and generating output data values as a function of corresponding input data values stored in multiple input data queues.

13. The method of claim 10, further including:

M is less than N; and generating output data values for multiple output queues as functions of corresponding input data values of at least one input queue.

14. The method of claim 10, wherein:

M is less than N; and generating output data values for multiple output queues by de-interleaving data values of at least one input queue.

15. The method of claim 10, further including:

before receiving input data values into M input queues, configuring a plurality of storage locations into the M input queues and N output queues.

16. The method of claim 10, further including:

prior to performing the arithmetic or logical operations on the data values, storing the input data values in memory locations of the memory device.

17. The method of claim 10, further including:

after performing the arithmetic or logical operations on the input data values, storing the resulting output data values in memory locations of the memory device.

18. A memory device, comprising:

a plurality of readable and writable locations, configurable to form a plurality of input queues and output queues, each output queue formed from output data sequences generated in response to an input data sequence of at least one input queue;

wherein the memory device is programmable into a configuration that defines a number of the input queues and a number of the output queues;

an input register configured to receive input data sequences into the memory device;

an output register configured to provide output data sequences from the memory device; and arithmetic-logic circuits coupled to at least one of the input or output registers and configured to operate on an input data sequence of at least one input queue to form at least one output data sequence;

wherein the configuration includes a parameter which defines arithmetic logic operations that are performed to form the at least one output data sequence.

19. The memory device of claim 18, wherein:

the input data sequences are stored in the readable and writable locations.

20. The memory device of claim 18, further including:

the output data sequences are stored in the readable and writable locations.

21. The memory device of claim 18, wherein:

each input and output queue has a configurable depth.

22. The memory device of claim 18, further including:

random access circuits for accessing data values stored in the readable and writable locations in a random access fashion.

* * * * *